United States Patent [19]
Danforth et al.

[11] Patent Number: 6,139,198
[45] Date of Patent: Oct. 31, 2000

[54] SYSTEM AND METHOD FOR ENABLING TRACING OF PROGRAM EXECUTION IN AN OBJECT-ORIENTED SYSTEM

[75] Inventors: Scott Harrison Danforth; Ira Richard Forman; Hari Haranath Madduri, all of Austin, Tex.

[73] Assignee: International Business Machines Corporation, Armonk, N.Y.

[21] Appl. No.: 08/943,994

[22] Filed: Oct. 3, 1997

Related U.S. Application Data

[63] Continuation of application No. 08/691,628, Aug. 2, 1996, abandoned, which is a continuation of application No. 08/318,016, Oct. 4, 1994, abandoned.

[51] Int. Cl.[7] ................................................ G06F 9/40
[52] U.S. Cl. ............................................................ 395/704
[58] Field of Search ................................. 395/704, 183.14

[56] References Cited

U.S. PATENT DOCUMENTS

| | | | |
|---|---|---|---|
| 4,802,165 | 1/1989 | Ream | 395/183.14 |
| 5,265,254 | 11/1993 | Blasciaket al. | 395/704 |
| 5,339,433 | 8/1994 | Frid-Nelson | 395/705 |
| 5,361,351 | 11/1994 | Lenkov et al. | 395/704 |
| 5,761,509 | 6/1993 | Danforth et al. | 395/701 |

OTHER PUBLICATIONS

Kovac, Paul et al. "We Have Mail", C users Journal, May 1993, V 11 n5 p. 120 (6).

Dale, Nell, Susan C. Lilly "Pascal Plus Data Structures" D.C. Heath & Co. pp. 54, 55, 1988.

Dilascia, Paul, "Fun with MFC", Microsoft Systems Journal Nov. 1993, V 8, n 11 p. 17(16).

Hyman, Marco S., "A debugging class for C++", Computer Language, v6, n10, p53(7), Oct. 1989.

*Metaclass Compatibility*, N. Graube, OOPSLA '89 Proceedings (Oct. 1989), pp. 305–315.

Proteus: A Frame–Based Nonmontonic Inference System, D. Russinoff, *Object–Oriented Concepts, Databases and Applications*, Kim, W. and Lochovskey, F.H. (ed.) ACM Press, New York (1989) pp. 127–150.

Object–Oriented Programming in OS/2 2.0, Roger Sessions and Nurcan Coskun, *IBM Personal Systems Developer* (Winter 1992).

Class Objects in SOM, Roger Sessions and Nurcan Coskun, *IBM Personal Systems Developer* (Summer 1992), pp. 67–77.

*Metaclasses are First Class: The ObjVlisp Model*, P. Cointe, OOPSLA '87 Proceedings (Oct. 1987), pp. 156–167.

*Programming with Explicit Metaclasses in Smalltalk–80*, J. Briot and P. Cointe, OOPSLA '89 Proceedings (Oct. 1989), pp. 419–431.

*Primary Examiner*—Thomas C. Lee
*Assistant Examiner*—St. John Courtenay, III
*Attorney, Agent, or Firm*—Mark S. Walker; Jenkins & Gilchrist

[57] ABSTRACT

A system and method for enabling a tracing of program execution within an object-oriented programming language environment. A new tracing class is created which is derived from the original class. When tracing is desired, a user creates instances of the tracing subclass instead of the original class and this instance is used in place of the original object. When tracing is not desired, a user merely creates and uses an instance of the original class. The new tracing subclass incorporates "print" statements, which permit observation of the control of code flow within the object.

6 Claims, 3 Drawing Sheets

SYSTEM AND METHOD FOR ENABLING TRACING OF PROGRAM EXECUTION IN AN OBJECT-ORIENTED SYSTEM

This application is a continuation of U.S. patent application Ser. No. 08/691,628, filed on Aug. 2, 1996, which was abandoned upon the filing hereof, which is a continuation of U.S. patent application Ser. No. 08/318,016, filed on Oct. 4, 1994, now abandoned.

TECHNICAL BACKGROUND OF THE INVENTION

The present invention relates generally to data processing systems and more particularly to the tracing of program execution within an object-oriented environment within a data processing system.

BACKGROUND OF THE INVENTION

The development of application and system software for data processing systems has traditionally been a time consuming task. The field of software engineering has attempted to overcome the limitations of traditional techniques by proposing new, more efficient software development models. Object-oriented programming has emerged as a promising technology that will allow rapid development, implementation, and customization of new software systems.

Progress in programming technology can be viewed as being shown by the increased level of abstraction employed. Programming technology has progressed through abstractions that grouped ever larger entities. Assembly language instructions were first gathered into control structures, and control structures were later gathered into procedures. Procedures, in turn, were gathered into abstract data types. Object-oriented programming can be viewed as providing a higher level of abstraction of programming entities than these previous techniques. Object-oriented programming gathers abstract data types into an inheritance hierarchy.

Object-oriented programming uses a toolkit of system objects that can be assembled to perform the required task. Each object has certain data attributes and processes or methods that operate on that data. Data is said to be "encapsulated" by an object and can only be modified by the object methods. Methods are invokes by sending a message to an object identifying the method and supplying any needed arguments.

Object-oriented systems have two important properties in addition to encapsulation. "Inheritance" is the ability to derive a new object from an existing object and inherit all properties, including methods and data structure, from the existing object. The new object may have certain unique features that are supplied as overrides or modifications to the existing class, i.e., a new subclass needs to specify only the functions and data that distinguish that class from the existing more general class.

"Polymorphism" is the second property. In object-oriented programming, polymorphism is the ability of an entity (e.g. a variable) to refer at run time to instances of different classes. Practically, this means that a single message to an object can be processed in different ways depending on the object itself.

Inheritance and polymorphism create a powerful structure for implementing new software systems. The software developer does not have to develop each piece of a system, he or she need only specify the unique features of the system.

For a further discussion of object-oriented programming, please refer to *Object-Oriented Technology: A Manager's Guide*, Taylor, D., Addison-Wesley 1994 and *Object-Oriented Analysis and Design*, Booch, G., 2nd Edition, The Benjamin Publishing Co. 1994, which are hereby incorporated by reference herein.

Within the development and use of software, it is often necessary to debug software in order to detect, locate, and correct logical errors in a computer program. Tracing the control flow of software through various procedures and functions is a well-known debugging technique. Tracing often involves the execution of a program code in such a way that the sequence of statements being executed can be observed. However, in order to implement a trace, programmers usually have to insert explicit "print" statements within the code in order to write the code to the screen, to a file, or to some other location for observation. The problem with such a technique is that the insertion of "print" statements within the code may affect the performance of the code and may insert run-time overhead within the execution of the code.

For example, consider an object X for which it is desired to trace a method invocation (requesting a method within an object to perform a task). Tracing entails "printing" (outputting) information about a method invocation (termed a "call message") and a return from the method (termed a "return message"). The prior technique of inserting "print" statements requires that individual print statements be directly placed within the method of object X; typically, such print statements are conditioned on a "trace" flag so that it may be turned off when not desired. With such a technique, the "trace" flag will have to be evaluated regardless of whether tracing is desired. This inserts run-time overhead within the code.

An alternative solution is to insert conditional compilation statements (programming language statements that select an execution path based on whether some condition is true or false), which do not insert any run-time overhead within the code but still require a compile time choice that cannot be changed at run-time.

Another technique is to implement traced classes with the assistance of metaclasses, which automatically bracket calls to a class method by a "before" method call and an "after" method call. In these "before" and "after" methods, "call and return" messages are printed. However, for an object-oriented programming language environment where metaclasses and run-time information on method signatures are not available, such a technique is not possible. For a further discussion of metaclasses, please refer to *Object-Oriented Programming in OS/2 2.0*, Sessions, Roger and Nurcan Coskun, IBM Personal Systems Developer (Winter 1992), pp. 107–119 and *Class Objects in SOM*, Sessions, Roger and Nurcan Coskun, IBM Personal Systems Developer (Summer 1992), pp. 67–77, which are hereby incorporated by reference herein.

Thus, there is a need for a system and method for tracing program execution within an object-oriented environment, which minimize run-time overhead and compilation time requirements. Further, there is a need in the art for a tracing technique that achieves minimal run-time overhead within an object-oriented programming language environment where metaclasses and run-time information on method signatures are not available.

SUMMARY OF THE INVENTION

Thus, it is an object of the present invention to trace program execution within an object-oriented programming language environment in a manner that minimizes run-time overhead and compilation without the utilization of meta-classes.

In an attainment of the above object, the present invention provides the programmer or user with knowledge of method (s) called (along with the parameters and return values) without having to insert explicit "print" statements within each and every method. The present invention creates a new subclass, which is derived from the original class to be traced, which supports all the methods of the original class and also prints a "call message" for each method invoked, calls the corresponding method within the original class, and upon return from that method prints a "return message" reflecting the return value from the original class.

When tracing is not required, the original class is utilized. When tracing is desired, an instance of the new tracing class is created.

As a result, an advantage of the present invention is that tracing of a class is only enabled when desired by creating an instance of the newly created "tracing" class. The new "tracing" class supports all the methods of the original class since it is a subclass of the original class.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

The preferred embodiment of the present invention will be described with reference to the figures in which like reference number represent like parts.

Figure 1:
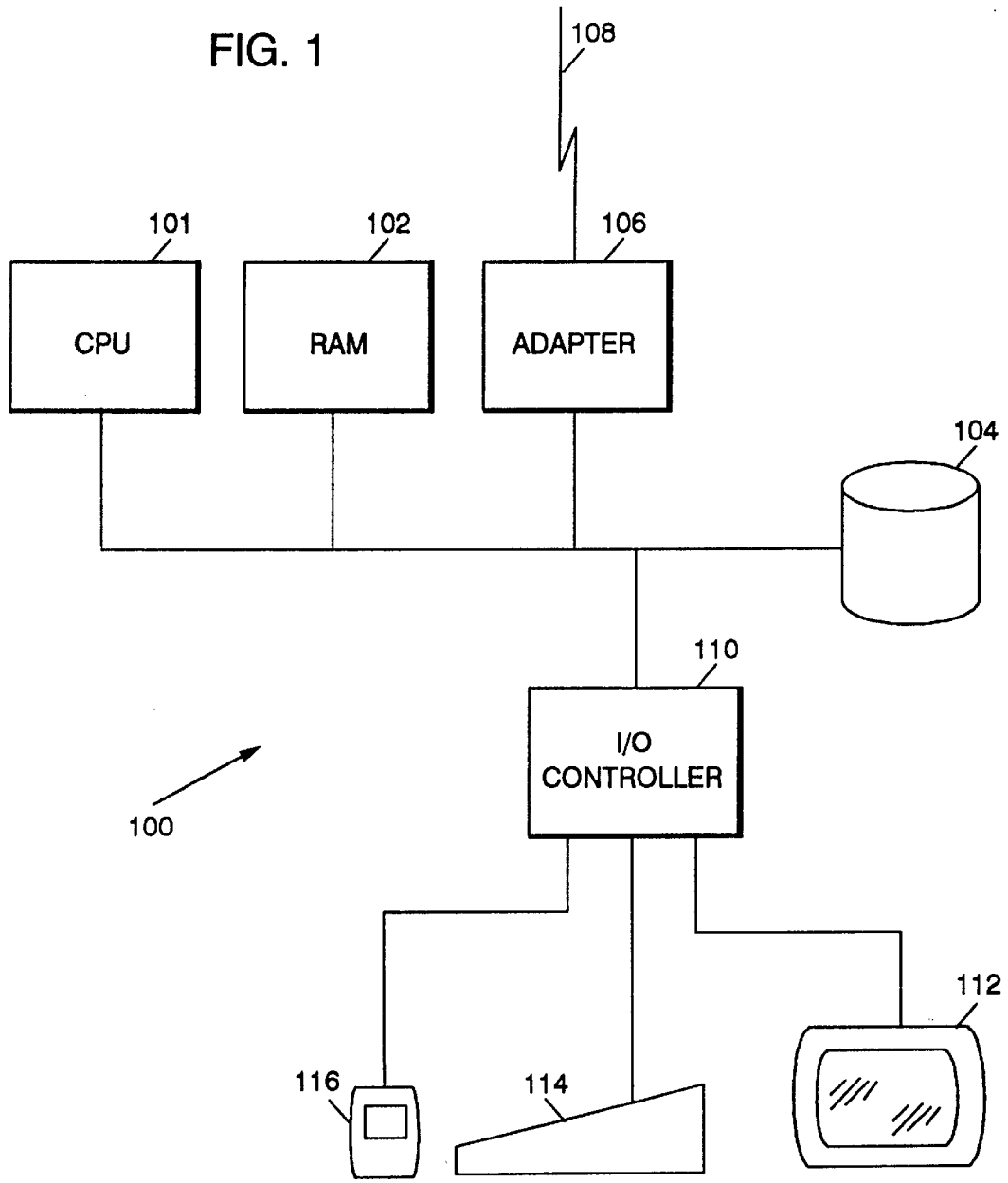
FIG. 1 is a block diagram of a data processing system of the type to embody the present invention.

FIG. 1 illustrates computer system 100 capable of being structured according to the present invention. Computer system 100 has processor 101, random access memory 104, permanent storage device 104, communications adapter 106 connecting system 100 to network 108, and I/O controller 110 controlling operation of display 112, keyboard 114, and pointing device 116. Computer system 100 can be one of many known systems such as the IBM Personal System/2 (PS/2) computer system or the IBM RISC System/6000 computer system. (IBM, Personal System/2, PS/2, and RISC System/6000 are trademarks of the IBM Corp.) The components can be of any known type. Permanent storage 104 can be a fixed disk storage system, a removable diskette, or other fixed or removable media such as tape cartridge, CD-ROM, or WORM. The framework of the present invention may be embodied in a removable media for storage and distribution.

As is well-known in the art of object-oriented programming, an object is a software "package" that contains a collection of related procedures and data. In the object-oriented approach, procedures go by a special name; they are called methods. In keeping with traditional programming terminology, the data elements are referred to as variables because their values can vary over time. Objects make ideal software modules because they can be defined and maintained independently of one another, with each object forming a neat, self-contained universe. Everything an object "knows" is expressed in its variables. Everything it can do is expressed in its methods.

A class is a template that defines the methods and variables to be included in a particular type of object. The descriptions of the methods and variables that support them are included only once, in the definition of the class. The objects that belong to a class, called instances of the class, contain only their particular values for the variables.

An object, then, is an instance of a particular class. Its methods and variables are defined in the class, and its values are defined in the instance.

As discussed above, inheritance is a mechanism whereby one class of object(s) can be defined as a special case of a more general class, automatically including the method and variable definitions of the general class. Special cases of a class are known as subclasses of that class; the more general class, in turn, may be known as a superclass of its special cases. In addition to the methods and variables they inherent, subclasses may define their own methods and variables and may override any of the inherited characteristics.

Classes can be nested to any degree, and inheritance will automatically accumulate down through all the levels. The resulting tree-like structure is known as a class hierarchy.

In the following referenced drawing figures, a simple object will be represented by a circle, while a pair of concentric circles will represent a class. A solid arrow will represent that an object is a subclass of a class, while a dashed arrow will represent that an object is an instance of the class to which it points.

Figure 3:
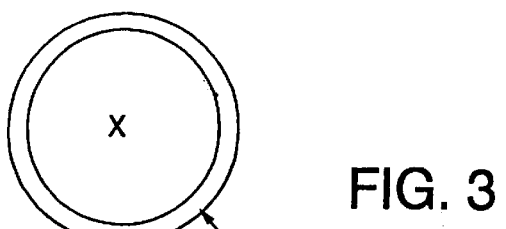
FIG. 3 illustrates the inclusion of a tracing subclass in accordance with the present invention.

As discussed above, it may be desired to trace program execution within an object. Referring to FIG. 3, it may be desired to trace one or more method invocations within object X. Traditional tracing techniques require "printing" of information about a method invocation and tracing of the return from the method (referred to as call and return messages). In order to trace one or more method invocations within object X, it would be required to insert "print" statements within object X, which results in undesirable run-time overhead.

FIG. 3 illustrates a class hierarchy tree representing an implementation of the present invention. The present invention creates a new subclass, which will be referred to hereinafter as TracedX, which is derived from the original class X. Since TracedX is a subclass of object X, TracedX supports all methods that object X supports. Therefore, any user of object X can use TracedX instead. TracedX is programmed in a manner well-known in the art to print "call messages," call the corresponding method in object X, and upon return from that method, print a "return message" reflecting the return value from object X.

Although there are now two classes in place of one, performance is gained when tracing is not required since a user may call object X instead of TracedX whenever tracing is not desired.

Though the present invention does require some space overhead since two classes are required in place of one, this equates to about the same overhead required as if trace statements were directly implemented within object X.

Figure 4:
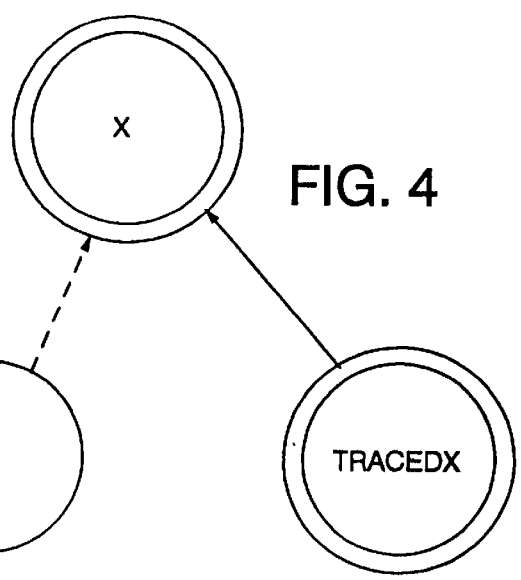
FIG. 4 illustrates a creation of an instance of a class wherein tracing is not desired.

Referring next to FIG. 4, there is illustrated a class hierarchy tree wherein tracing of object X is not desired. This is implemented by creating an instance A of object X.

Figure 5:
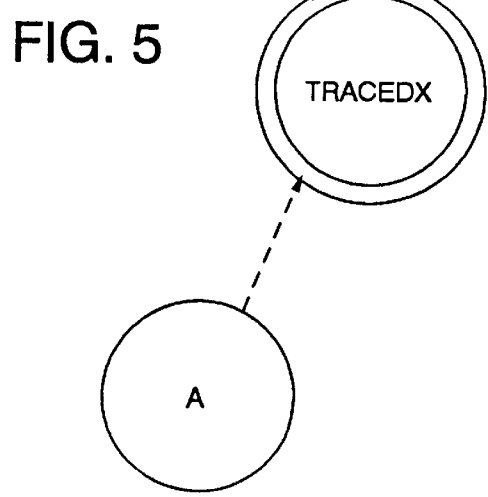
FIG. 5 illustrates a creation of an instance in accordance with the present invention.

Referring next to FIG. 5, there is illustrated an implementation of the present invention wherein tracing of object X is desired by creating an instance A of object TracedX. In this manner, when a method in object X is desired to be invoked, object TracedX will print a "call message," call the corresponding method in object X, and upon return from that method, print a "return message" reflecting the return value from object X. The result is that tracing of the invoked method is accomplished through subclass TracedX.

Figure 2:
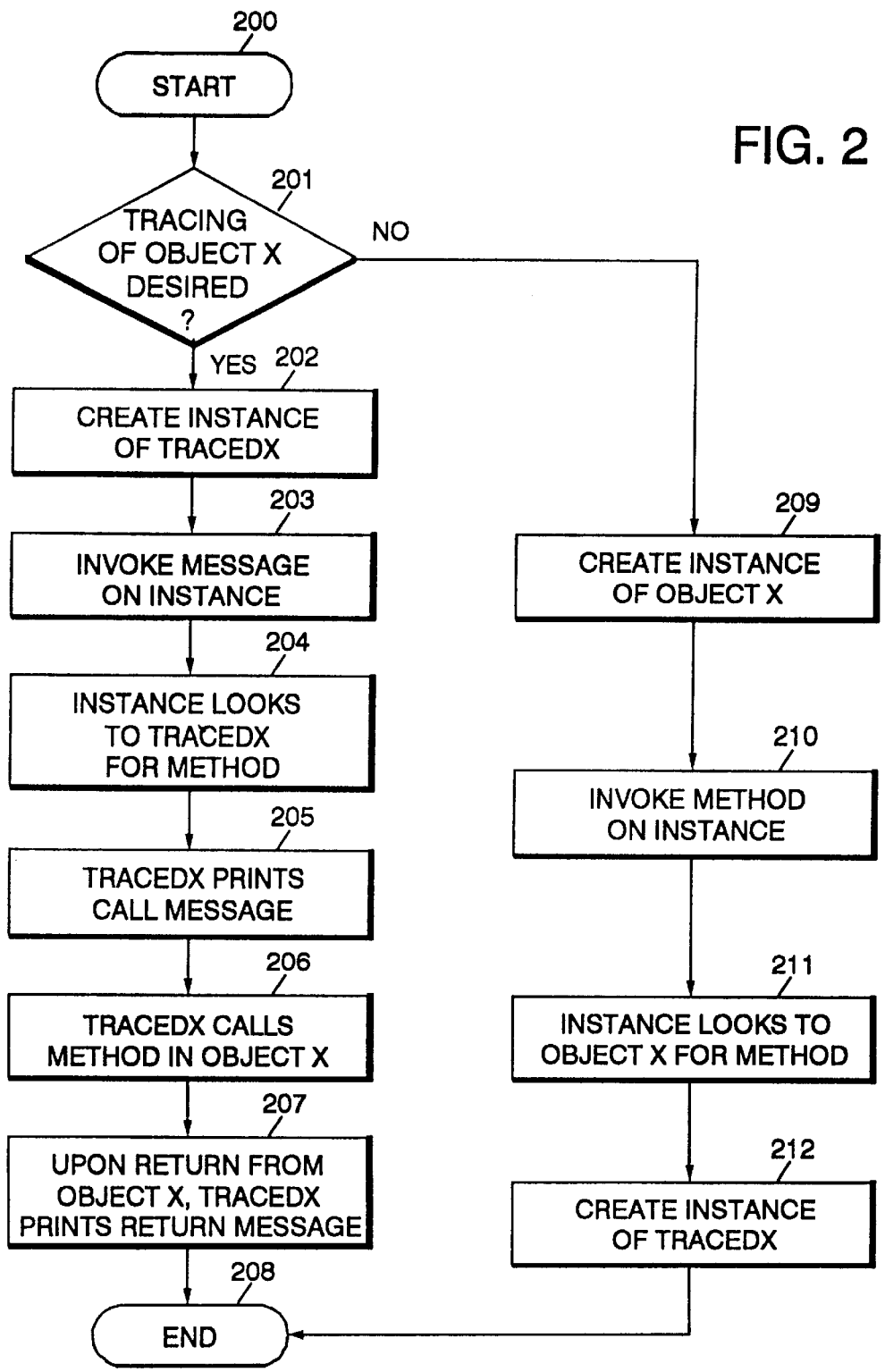
FIG. 2 illustrates a flow diagram in accordance with the present invention.

Referring next to FIG. 2, there is illustrated a flow diagram illustrating the process of the present invention. The process begins at step 200 and proceeds to step 201 where a decision is made whether or not to trace object X. If tracing is not desired, the process shifts to 209 to create an instance of object X. Then at step 210, the desired method of object X is invoked by receipt of a message in the instance. At step 211, the instance looks to object X for the method, and at step 212, the method is invoked within object X and the process ends at step 208.

However, if at step 201 tracing is desired, the process will shift to step 202 to create an instance of TracedX. At step 203, a message is sent to the instance to invoke the desired method of object X. At step 204, the instance looks to object TracedX for the method. At step 205, object TracedX prints a call message associated with the calling of the method in object X. At step 206, object TracedX calls the method in object X, and at step 207, object TracedX prints the return message upon return from object X. The process ends at step 208.

Although the present invention and its advantages have been described in detail, it should be understood that various changes, substitutions and alterations can be made herein without departing from the spirit and scope of the invention as defined by the appended claims.

What is claimed is:

1. A process implemented in a computer system for selectively tracing a method within a class of an object in an object-oriented programming language environment, wherein said class comprises data and one or more methods for operating on said data, said process comprising the steps of:

creating a trace subclass of said class to be traced, wherein said trace subclass is derived from said class, supports all methods of said class, and further includes program code executable to enable run-time tracing of a method of said class;

determining whether to trace a desired method of said class;

if tracing said desired method of said class, then performing the following steps:
a) creating a trace instance of said trace subclass; and
b) sending a message to said trace instance for invoking said desired method, wherein said trace instance looks to said trace subclass for said desired method and the invoking and run-time tracing of said desired method is accomplished through said trace subclass; and if not tracing said desired method of said class, then performing the following steps:

a) creating an instance of said class; and
b) sending a message to said instance for invoking said desired method, wherein said instance looks to said class for said desired method, thereby avoiding run-time overhead time requirements associated with tracing said desired method.

2. The process as recited in claim 1, wherein said program code is executable to (i) output a call message for said desired method, (ii) call said desired method within said class, and (iii) output a return message upon return from said desired method, the return message reflecting a return value from said class.

3. A computer system for selectively tracing a method within a class of an object in an object-oriented programming environment, wherein said class comprises data and one or more methods for operating on said data, said system comprising:

means for creating a trace subclass of said class to be traced, wherein said trace subclass is derived from said class, supports all methods of said class, and further includes program code executable to enable run-time tracing of a method of said class;

means for determining whether to trace a desired method of said class;

means for creating a trace instance of said trace subclass when tracing said desired method;

means for sending a message to said trace instance for invoking said desired method when tracing said desired method, wherein said trace instance looks to said trace subclass for said desired method and the invoking and run-time tracing of said desired method is accomplished through said trace subclass;

means for creating an instance of said class when not tracing said desired method of said class; and means for sending a message to said instance for invoking said desired method of said class when not tracing said method, wherein said instance looks to said class for said desired method, to thereby avoid run-time overhead time requirements associated with tracing said desired method.

4. The system as recited in claim 3, wherein said program code is executable to (i) output a call message for said desired method, (ii) call said desired method within said class, and (iii) output a return message upon return from said desired method, the return message reflecting a return value from said class.

5. The computer program product comprising:

a program storage device readable by a computer system tangibly embodying a program of instructions executable by said computer system to perform process steps for selectively tracing a method within a class of an object in an object-oriented programming language environment, wherein said class comprises data and one or more methods for operating on said data, said process steps comprising:

creating a trace subclass of said class to be traced, wherein said trace subclass is derived from said class, supports all methods of said class and, and further includes program code executable to enable run-time tracing of a method of said class;

determining whether to trace a desired method of said class;

if tracing said desired method of said class, then performing the following steps:
a) creating a trace instance of said trace subclass; and
b) sending a message to said trace instance for invoking said desired method, wherein said trace instance looks to said trace subclass for said desired method and the invoking and run-time tracing of said desired method is accomplished through said trace subclass; and if not tracing said desired method, then performing the following steps:
  a) creating an instance of said class; and
  b) sending a message to said instance for invoking said desired method, wherein said instance looks to said class for said desired method, thereby avoiding run-time overhead time requirements associated with tracing said desired method.

6. The computer program product of claim 5, wherein said program code is executable to (i) output a call message for said desired method, (ii) call said desired method within said class, and (iii) output a return message upon return from said desired method, the return message reflecting a return value from said class.

* * * * *